(No Model.)

P. C. THOMPSON.
Stump Pullers.

No. 229,776. Patented July 6, 1880.

Witnesses.
Fred. G. Dieterich
Albert H. Krause

Inventor:
Presly C. Thompson
by Louis Bagger & Co.
Attorneys

UNITED STATES PATENT OFFICE.

PRESLY C. THOMPSON, OF STICKLEYVILLE, VIRGINIA.

STUMP-PULLER.

SPECIFICATION forming part of Letters Patent No. 229,776, dated July 6, 1880.

Application filed May 12, 1880. (No model.)

*To all whom it may concern:*

Be it known that I, PRESLY C. THOMPSON, of Stickleyville, in the county of Lee and State of Virginia, have invented certain new and useful Improvements in Stump-Pullers; and I do hereby declare that the following is a full, clear, and exact description of the invention, which will enable others skilled in the art to which it appertains to make and use the same, reference being had to the accompanying drawings, which form a part of this specification, and in which—

Figure 1:
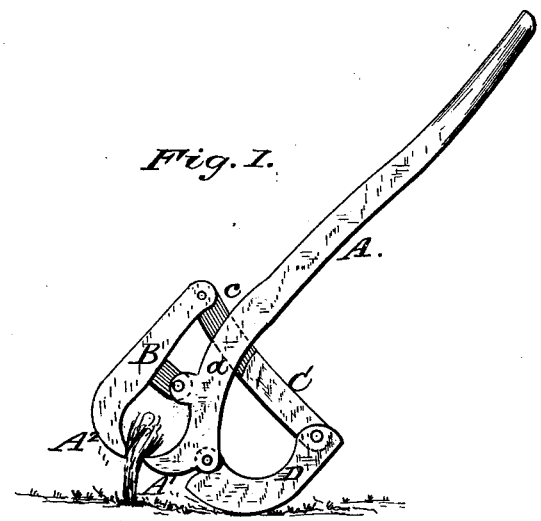
Figure 2:
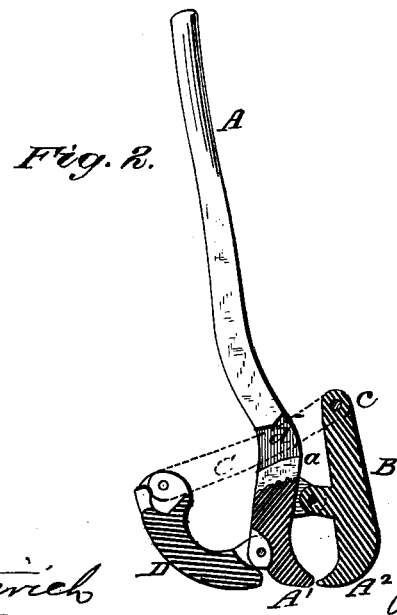

Figure 1 is a side view of my improved spike-extractor, which is also adapted for extracting from the ground small vegetables or plants. Fig. 2 is a vertical section through the same.

This invention contemplates improvements in machines for extracting or pulling spikes, which is equally adapted for extracting from the ground small vegetables or plants in an expeditious and effectual manner; and it consists of a main hand-lever more or less bent, and with its lower end adapted to catch under the spike-head or impinge against the body of the plant, and having articulated to it a jaw with whose upper end is connected a sliding bar connected to a fulcrum pivoted to the heel of the main lever or jaw, substantially as hereinafter more fully set forth.

A in the accompanying drawings marks the manipulating-lever, more or less bent, or having a knee, $a$, with its lower end forming a claw, A', and having articulated to it a jaw, B, whose lower end has a claw, $A^2$, which, with the claw of the lever, grasps and effects the pulling or extraction of the spike or plant.

Connected to the upper end of the jaw B is a sliding bar, C, with its inner side recessed or grooved, as at $c$, and moving in a recess or groove, $d$, in the facing side of the lever, with its other end connected to a fulcrum or bar, D, pivoted to the heel of the lever A, and curved outwardly in the direction of its length.

By inserting the claws or lips of the jaw B and the lower end of the lever A under the head-flange of the spike and pressing against the lever toward and with the curved or convexed fulcrum presented toward and resting upon the ground the spike will be extracted or loosened, so as to be readily and easily removed.

It is obvious that with the jaw and lever claw replaced by a slight blunt surface the extractor can be used for pulling or extracting plants.

This instrument is exceedingly simple and effective and expeditious in operation.

Having thus fully described my invention, I claim and desire to secure by Letters Patent of the United States—

The lever A, with the knee $a$, having the claw A', in combination with the jaw B, articulated to the jaw of the lever, slide C, and fulcrum D, substantially as and for the purpose set forth.

In testimony that I claim the foregoing as my own I have hereto affixed my signature in presence of two witnesses.

PRESLY C. THOMPSON.

Witnesses:
ANDREW J. LITTON,
HUGH S. SCOTT.